Feb. 8, 1966  C. C. STANTON  3,233,907
COUPLING FOR JOINING PIPE SECTIONS OF DIFFERING DIAMETER
Filed April 1, 1963
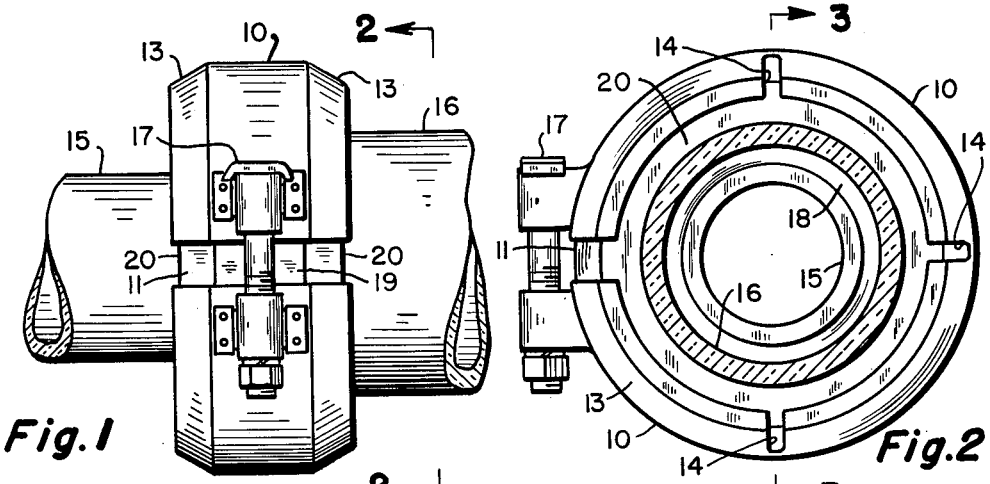
Fig.1
Fig.2
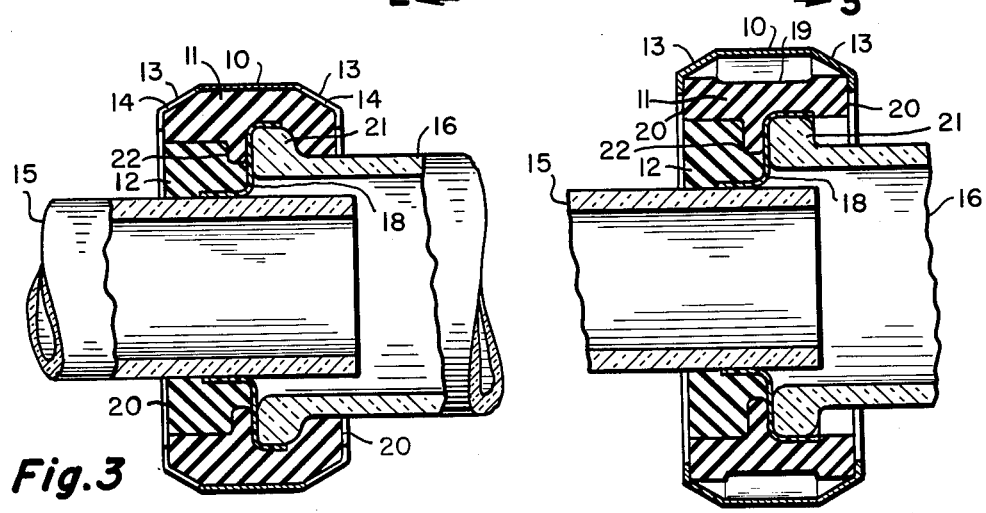
Fig.3
Fig.4
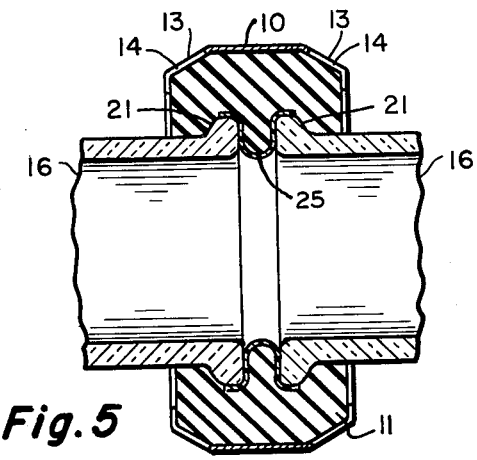
Fig.5
INVENTOR.
Courtland C. Stanton
BY
*Clarence R. Patty J.*
HIS ATTORNEY

United States Patent Office 3,233,907
Patented Feb. 8, 1966

3,233,907
COUPLING FOR JOINING PIPE SECTIONS OF DIFFERING DIAMETER
Courtland C. Stanton, Corning, N.Y., assignor to Corning Glass Works, Corning, N.Y., a corporation of New York
Filed Apr. 1, 1963, Ser. No. 269,415
3 Claims. (Cl. 277—101)

This invention relates to pipe couplings and more particularly to couplings for joining sections of pipe differing from one another in diameter.

An object of the present invention is to provide a coupling which permits two sections of pipe to be joined in adjustable telescoping relationship.

A further object is to provide a coupling which may be adapted to join sections of pipe differing in diameter by varying amounts.

These and other objects, which will be apparent from the description, are accomplished by the provision of a pipe coupling comprising a generally cylindrical compression band having tapered edge portions and surrounding a gasket which bears upon the outer surfaces of the pipes to be joined.

The coupling of the present invention will be described in detail with reference to the following drawing, in which:

FIGURE 1 is a side view of an assembled coupling according to the invention.

FIGURE 2 is a sectional view taken on line 2—2 of FIGURE 1,

FIGURE 3 is a sectional view taken on line 3—3 of FIGURE 2,

FIGURE 4 is a view similar to that of FIGURE 3 before the outer band has been tightened about the gasket, and FIGURE 5 is a view similar to that of FIGURE 3, illustrating a coupling comprising components of the coupling of the present invention.

Referring to FIGURES 1-4, in its preferred embodiment the coupling of the present invention comprises metal band 10 surrounding a rubber gasket which includes main portion 11 and adaptor portion 12. Band 10 is generally cylindrical but is provided with inwardly tapering edge portions 13, which contain slots such as 14, to permit the band to be bent around pipe sections 15 and 16 by means of clamping bolt 17. The gasket is provided with corrosion-resistant liner 18, formed, for example, of polytetrafluoroethylene, to protect the gasket and prevent extrusion of the gasket into the bore of pipe 16.

The relationship of the parts of the present coupling prior to the tightening of bolt 17 is illustrated in FIGURE 4. Main portion 11 of the gasket has an outer surface which is generally cylindrical, but which has a central indentation 19 to facilitate the bending of the appropriate edge 20 of gasket main portion 11 around a bead 21 on the end of the larger section of pipe due to the compressive force exerted by edge portion 13 of band 10 as the band is tightened about the pipes to the position illustrated in FIGURE 3. During compression of the band, the edge portion 13 which surrounds the smaller section of pipe 15 forces the other edge 20 to main portion 11 of the gasket downward. The force is transmitted to gasket adaptor portion 12, which in turn bears upon the outer surface of pipe 15 thereby gripping the pipe and preventing its axial movement with respect to the coupling. Adaptor 12 also bears upon corrosion-resistant liner 18 and forces the liner against the smaller pipe to form a corrosion-resistant seal therewith, the other end of the liner being bent around bead 21 of pipe 16 and forming a seal therewith. Liner 18, although preferable, is not essential if the gasket is sufficiently resistant to corrosion and extrusion.

The gasket of the present coupling is formed in two parts in order to facilitate the adaptation of the coupling for joining pipe sections differing in diameter by varying amounts. If, for example, in the illustrated embodiment pipe 15 were to be replaced by a pipe having a smaller diameter, the only change that would need to be made in the illustrated coupling would be the substitution for adaptor 12 of another adaptor of greater radial thickness and the substitution for liner 18 of another liner of appropriate shape.

An advantage accruing from this feature of the invention can be appreciated when it is considered that band 10, gasket main portion 11 and an appropriate liner 25 covering rib 22 of the gasket main portion can be used without a gasket adaptor portion to join together two identical sections of pipe such as 16. It is for this reason that gasket main portion 11 is provided with interior annular rib 22 to form a seal between the opposed beaded ends of two pipe sections such as 16. Such an arrangement, which does not form a part of the present invention, is illustrated in FIGURE 5. If the advantages of such adaptability are not desired, gasket portions 11 and 12 of the gasket of the present invention can be formed as a single piece.

One advantage of the present coupling is that the degree of telescoping between the large and small pipe sections may be adjusted after the coupling has been assembled by merely loosening bolt 17 and sliding pipe 15 either in or out of pipe 16 as desired.

It will be apparent that variations from that described above as a preferred embodiment of the invention may be made by those skilled in the art within the scope of the invention. Accordingly, it is intended that the present invention be limited only by the scope of the appended claims.

What is claimed is:

1. A pipe coupling joining a first section of pipe with a second section of pipe having an outer diameter smaller than the inner diameter of said first section, said coupling comprising a band encircling the ends of said sections, said band having inwardly tapered edge portions, and between said band and said pipe sections a gasket comprising an inner gasket portion having an inner surface bearing against the outer surface of said second pipe section and a separate outer gasket portion having an outer surface bearing against said band and an inner surface bearing against the outer surface of said inner gasket portion and against the outer surface of said first pipe section, said tapered edge portions of said band compressing edge portions of said outer gasket portion, said inner surface of said gasket outer portion having a centrally located inwardly projecting annular rib and said first pipe section having a bead at its end, said rib projecting from said inner surface of said gasket outer portion by a distance substantially equal to the thickness of said bead, said gasket being separated from the interiors of said pipe sections by a corrosion-resistant liner, said liner being held against said bead of said first pipe section by said gasket outer portion and by said rib on said gasket outer portion and being held against the outer surface of said second pipe section by said gasket inner portion.

2. A pipe coupling joining a first section of pipe with a second section of pipe having an outer diameter smaller than the inner diameter of said first section, said coupling comprising a band encircling the ends of said sections, said band having inwardly tapered edge portions, and between said band and said pipe sections a gasket comprising an inner gasket portion having an inner surface bearing against the outer surface of said second pipe section and a separate outer gasket portion having an outer surface bearing against said bead and an inner surface bearing against the outer surface of said inner gasket portion and against the outer surface of said first pipe section, said tapered edge portions of said band compressing edge portions of said outer gasket portion, said inner surface of said gasket outer portion having a centrally located inwardly projecting annular rib, said first pipe section having a bead at its end, said rib projecting from said inner surface of said gasket outer portion by a distance substantially equal to the thickness of said bead, said outer surface of said gasket outer portion having a channel intermediate its ends prior to the tightening of said band, said gasket being separated from the interiors of said pipe ssections by a corrosion-resistant liner, said liner being held against said bead of said first pipe section by said gasket outer portion and by said rib on said gasket outer portion and being held against the outer surface of said second pipe section by said gasket inner portion, and said inwardly tapered edge portions of said band having slots therein to facilitate the bending of said band about said gasket.

3. A pipe coupling joining a first section of pipe with a second section of pipe having an outer diameter smaller than that of said first section, said coupling comprising a band encircling the ends of said sections, said band having inwardly tapered edge portions, and between said band and said pipe sections a gasket comprising an inner gasket portion having an inner surface bearing against the outer surface of said second pipe section and a separate outer gasket portion having an outer surface bearing against said band and an inner surface bearing against the outer surface of said inner gasket portion and against the outer surface of said first pipe section, said tapered edge portions of said band compressing edge portions of said outer gasket portion, said second pipe section telescoping into said first pipe section, said inner surface of said gasket outer portion having a centrally located inwardly projecting annular rib, said first pipe section having a bead at its end, said rib projecting from said inner surface of said gasket outer portion by a distance substantially equal to the thickness of said bead, said outer surface of said gasket outer portion having a channel intermediate its ends prior to the tightening of said band, said gasket being separated from the interiors of said pipe sections by a corrosion-resistant liner, said liner being held against said bead of said first pipe section by said gasket outer portion and by said rib on said gasket outer portion and being held against the outer surface of said second pipe section by said gasket inner portion, said inwardly tapered edge portions of said band having slots therein to facilitate bending of said band about said gasket.

References Cited by the Examiner

UNITED STATES PATENTS

| 2,028,182 | 1/1936 | Barnickol | 285—112 |
| 2,080,271 | 5/1937 | Hirst | 285—177 |
| 2,548,896 | 4/1951 | Gutterman | 285—177 |
| 2,885,949 | 5/1959 | Curtis | 285—231 |
| 3,006,663 | 10/1961 | Bowne | 285—373 X |
| 3,061,665 | 10/1962 | Rugg | 285—177 |
| 3,065,000 | 11/1962 | Stanton | 285—177 |
| 3,084,959 | 4/1963 | Stanton | 285—233 |
| 3,104,898 | 9/1963 | MacDonald | 285—367 |
| 3,178,206 | 4/1965 | Martin et al. | 285—233 X |

FOREIGN PATENTS

| 806,526 | 9/1936 | France. |
| 1,141,273 | 3/1957 | France. |
| 1,147,654 | 6/1957 | France. |
| 244,253 | 12/1925 | Great Britain. |
| 809,583 | 2/1959 | Great Britain. |
| 834,853 | 5/1960 | Great Britain. |
| 913,904 | 12/1962 | Great Britain. |

CARL W. TOMLIN, *Primary Examiner.*

THOMAS F. CALLAGHAN, *Examiner.*